UNITED STATES PATENT OFFICE.

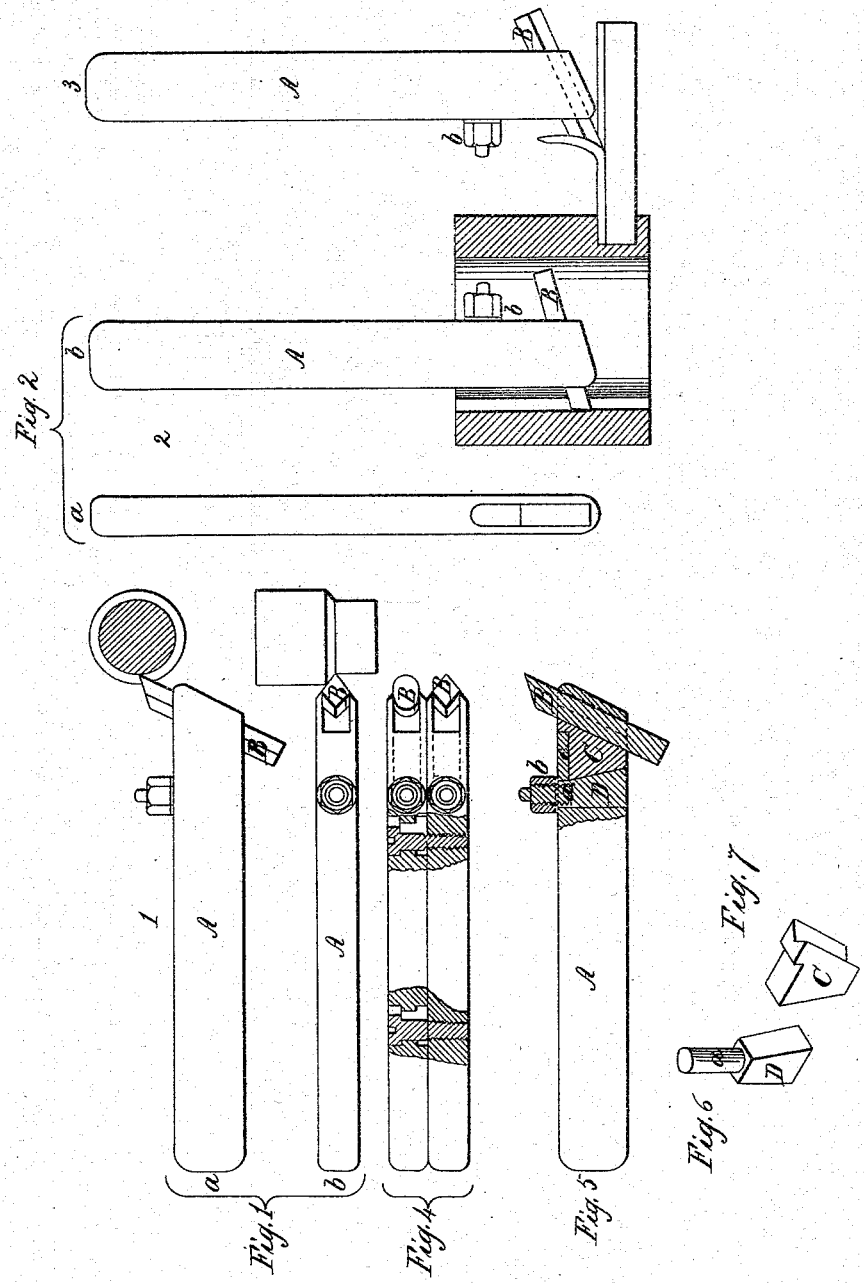

THEODORE COOPER, OF CROMPTON MILLS, WARWICK, ASSIGNOR TO HIMSELF AND THOMAS PHILLIPS, OF PROVIDENCE, RHODE ISLAND.

IMPROVEMENT IN TOOLS FOR TURNING OR PLANING IRON.

Specification forming part of Letters Patent No. 56,141, dated July 3, 1866.

*To all whom it may concern:*

Be it known that I, THEODORE COOPER, of Crompton Mills, Warwick, in the county of Kent and State of Rhode Island, have invented a new and useful Improvement in Tools for Lathes, Planers, and Similar Machines; and I do hereby declare that the following specification, taken in connection with the drawings making a part of the same, is a full, clear, and exact description thereof.

Figure 1, *a* and *b*, shows a side elevation and top view of my improved tool fitted for turning off a shaft in a lathe. Fig. 2, *a* and *b*, show the same holder with a slotting-tool. Fig. 3 shows the tool as fitted for a planer. Fig. 4 is a double tool-holder, fitted with two cutters, one for rough dressing and the other for finishing. Fig. 5 is a longitudinal and vertical section through Fig. 1. Figs. 6 and 7 are details to be referred to.

The purpose of my invention is to avoid the great waste of expensive material which now results in machine shops from the necessity of keeping on hand the required assortment of turning and similar cutting-tools, the cutting end and shank of each of which is made from one piece of bar-steel. Tools so made, in addition to the cost of forging into shape in the first instance by the blacksmith, have not on the average more than two inches of their length which is available for cutting purposes, the rest of their length—say from four to six inches—being required as a shank or support for the tool when adjusted in the machine. When such tools have become so short, from repeated grinding and forging, that they cannot be longer used, the remainder is worked into whatever purpose it can be accidentally used for, but always with more or less waste of material.

In the accompanying drawings, A, Fig. 1, represents a bar of metal, which may be of cast-iron or of any preferred material, and is of the dimensions which will most conveniently fit the machines in which it is to be used as a substitute for the shank of the tool above referred to.

B is the cutting-tool, which may be made from a small bar of steel and ground at the edge in any form desired, according to the kind of cut required. No expense of forging is required, or comparatively none, as merchantable steel of the proper size can readily be procured in rods from the mills where the steel is rolled and from dealers. This cutting-tool is placed in the holder or shank A at any convenient or preferred angle with the longitudinal axis of the latter, as shown in Figs. 1 and 5, for the reason that this not only corresponds with the angle at which the cutting portion is forged with reference to the shank in the old form of tool, and therefore familiar to all workmen, but especially for the reason that if the axes of the two cross each other an opportunity is afforded for bracing the cutter against the resistance caused by the work, and thereby making it as free from liability to tremble or chatter as if it were forged upon a shank.

The cutter is secured in the holder by means of a clamp, which is shown in Fig. 5. A mortise or slot is cut through the holder of sufficient width to accommodate the cutter B, and the end of the same is made V form, half-round, or otherwise, to correspond with the form of the rod of which the cutter is made; and if the cutter is to stand at an angle with the axis of the holder the end of the mortise should be cut at the same inclination.

C, Fig. 5, (shown in detail in Fig. 7,) is the other half of the clamp between which the cutter is to be griped.

The mortise already spoken of as made in the holder, extends toward the rear, as shown at Fig. 5, for a greater distance upon the back side than upon the front, and is of sufficient capacity to allow this part of the clamp to be inserted from the back side and take a bearing against the portion of the holder *c* which is not cut away, and there is space to accommodate also the key D, whose face next the rear end of the clamp C is an inclined plane, corresponding with a similar plane made on the end of such clamp. This key has a spindle or neck, *a*, Fig. 6, which projects above the top surface of the holder A when the key is in position, and has a thread cut upon it, to which a nut, *b*, is fitted. It is quite obvious that as the nut *b* is turned the key will be drawn upward and the clamp C will be made to move laterally and gripe the cutter to hold it firmly in place.

At Fig. 4 is shown a double holder, or one fitted to contain two cutting-tools, and which may be either a holder with two mortises and appropriate clamps and keys, or, as in the instance shown, be two distinct holders bolted together. The arrangement exhibited in this figure is very useful where two kinds of cuts are desired in turning off work in the lathe—the one for the rough and the other for the finishing cut.

The drawings exhibit the capacity of adaptation of my improvement to the various classes of machines which employ similar tools. It is apparent that its use will effect a great economy, both in saving the time which is now required to be spent in forging the description of tool generally used and in the quantity of expensive material fit for cutters required to be kept on hand; besides, too, a cutter made and clamped as I propose can be used so long as it has sufficient length to be griped firmly by the clamps, and when no longer fit for use the quantity of material lost is trifling as compared with the loss in the other case.

I am aware that a holder of iron made in two parts and furnishing a support for an intermediate cutter of steel has been heretofore patented to John Mooney, of Providence, Rhode Island; but such arrangement, though exhibiting a separate holder and cutter in combination, is different in principle from mine, and has been found to be objectionable from the great liability of the cutter to chatter.

What I claim as my invention, and desire to secure by Letters Patent, is—

The holder A, cutter B, clamp C, and key D, arranged substantially as described, for the purpose specified.

THEODORE COOPER.

Witnesses:
JOHN D. THURSTON,
GEORGE B. BARROWS.